(12) United States Patent
Kim et al.

(10) Patent No.: US 9,840,427 B2
(45) Date of Patent: Dec. 12, 2017

(54) LOW-TEMPERATURE UNDERWATER PLASMA GENERATING DEVICE

(71) Applicant: Jung Il Kim, Seoul (KR)

(72) Inventors: Jung Il Kim, Seoul (KR); Young Gu Cheun, Daejeon (KR)

(73) Assignee: Jung Il Kim, Seoul (KR)

( * ) Notice: Subject to any disclaimer, the term of this patent is extended or adjusted under 35 U.S.C. 154(b) by 0 days.

(21) Appl. No.: 15/313,901

(22) PCT Filed: May 3, 2016

(86) PCT No.: PCT/KR2016/004657
§ 371 (c)(1),
(2) Date: Nov. 23, 2016

(87) PCT Pub. No.: WO2016/178501
PCT Pub. Date: Nov. 10, 2016

(65) Prior Publication Data
US 2017/0197849 A1    Jul. 13, 2017

(30) Foreign Application Priority Data
May 4, 2015  (KR) .......................... 10-2015-0062713

(51) Int. Cl.
*C02F 1/46*  (2006.01)
*H05H 1/24*  (2006.01)
(Continued)

(52) U.S. Cl.
CPC ......... *C02F 1/4608* (2013.01); *H05H 1/2406* (2013.01); *C02F 2103/008* (2013.01);
(Continued)

(58) Field of Classification Search
CPC ........ C02F 1/46; C02F 103/08; C02F 1/4672; C02F 1/001; C02F 1/4602;
(Continued)

(56) References Cited

U.S. PATENT DOCUMENTS

| 9,117,616 B2 | 8/2015 | Sohn | |
|---|---|---|---|
| 2002/0014460 A1* | 2/2002 | McKay | ................. C02F 1/4606 210/696 |

(Continued)

FOREIGN PATENT DOCUMENTS

| KR | 10-2004-0010895 A | 2/2004 |
|---|---|---|
| KR | 10-2008-0108767 A | 12/2008 |

(Continued)

OTHER PUBLICATIONS

Purifier using Plasma and adsorbent Hong, Jeong Mi; Kim, Jeong Sun; Kim, Yun Gi; Sim, Yeon Geun (Inventors). Institute for Advanced Engineering (Assignee). KR 1020040010895 A. (Published Feb. 5, 2004). English translation.*

*Primary Examiner* — Walter D. Griffin
*Assistant Examiner* — Cameron J Allen
(74) *Attorney, Agent, or Firm* — Rabin & Berdo, P.C.

(57) ABSTRACT

An underwater low temperature plasma generating device includes a first electrode of a tubular type, a second electrode that is arranged inside the first electrode to generate bubbles in water introduced into the first electrode, an insulator arranged between the first electrode and the second electrode and a power supply. The plasma generating device generates low temperature plasma by generating an electric field underwater. The plasma generating device can be used to sterilize contaminated water with low temperature plasma that is generated underwater.

9 Claims, 4 Drawing Sheets

(51) Int. Cl.
 *C02F 103/00* (2006.01)
 *C02F 103/42* (2006.01)
(52) U.S. Cl.
 CPC ...... *C02F 2103/42* (2013.01); *C02F 2303/04* (2013.01); *H05H 2001/2412* (2013.01); *H05H 2001/2431* (2013.01)
(58) Field of Classification Search
 CPC ............ C02F 2103/023; C02F 2103/20; C02F 2201/4615; C02F 2303/04; A61L 2/14; Y10S 261/11
 See application file for complete search history.

(56) References Cited

U.S. PATENT DOCUMENTS

2008/0303439 A1   12/2008   Kim
2015/0137677 A1    5/2015   Sohn

FOREIGN PATENT DOCUMENTS

| KR | 10-2009-0097340 A | 9/2009 |
| KR | 10-1191146 B1 | 10/2012 |
| KR | 10-2014-0141798 A | 12/2014 |
| KR | 10-1500420 B1 | 3/2015 |

\* cited by examiner

LOW-TEMPERATURE UNDERWATER PLASMA GENERATING DEVICE

TECHNICAL FIELD

The present invention relates generally to a low temperature plasma generating device and, more particularly, to a device that can sterilize contaminated water with low temperature plasma.

BACKGROUND ART

Plasma is an ionized gas called a fourth state of matter, the other states being solid, liquid, and gas. Plasma is composed of ions, neutrons, and electrons that are at a normal or activated state. Plasma is an electrically neutral medium from a macroscopic viewpoint. However, since plasma includes free charged-holes, plasma can be electrically conductive.

When gas is subject to strong energy, electrons are separated from atoms or molecules, resulting in plasma in which electrons and positive ions are present in a mixture. Plasma is a highly reactive medium having high redox reactivity. Plasma may be in a high temperature environment or a low temperature environment according to methods by which particles are activated and operation energy used to generate the plasma. Plasma with a high temperature environment is called high temperature plasma and plasma with a low temperature environment is called low temperature plasma. Due to this broad temperature range of plasma, plasma technologies are applicable in various fields such as surface coating, gas treatment, waste removal, chemical redox reaction, synthesis of novel materials, and mechanical work.

In water treatment, conventional methods involve use of an expensive filter system, ozone, or ultraviolet rays all of which are expensive methods, or chemicals such as chlorine, which is an inexpensive method.

For example, in the case of treatment of ballast water, when ballast water is introduced into or pumped out of ships, hazardous aquatic life or marine creatures in seawater move in and out of the ship. In order to prevent a marine ecosystem from being destroyed by foreign marine creatures that move along ballast water in ships moving from one country to another, ballast water treatment technologies that are currently being used mainly include electrolysis, ozone treatment, ultraviolet-ray sterilization, and electrolysis. However, these methods require expensive equipment, strong energy, and high power consumption.

When sanitizing swimming pool water, the water is usually sanitized with a circulation filter and chlorine. For this, chlorine is normally fed three or four times a day and a circulation filtering process is performed. For the form of chlorine used for chlorine disinfection, a chlorine gas is used for large swimming pools and hypo sodium chlorite is used for small swimming pools. Chlorine feeding is advantageous in terms of perfect sterilization effect and easy water treatment for a large volume of water at a single time. However, it is disadvantageous in that feeding has to be performed every four hours due to low solubility of chlorine in water.

Furthermore, this water treatment technology involving underwater chlorine feeding has side effects such as environmental pollution and negative effects on human bodies when high doses of chlorine are used. In terms of other treatment methods, ozone-based treatment is problematic in terms of low cost efficiency due to installation costs and operation costs, and ultraviolet-ray treatment technology is disadvantageous in terms of frequent replacements of lamps, reduction in effective period and valid irradiation distance of lamps attributable to adhesion of polysaccharides to the surface of a quartz tube of lamps, leakage of a wavelength source material sealed in a quartz tube attributable to tube breaking, and toxicity of a wavelength source material that is leaked from a quartz tube.

In addition, there is disclosed a water treatment apparatus and method using low temperature plasma. This technology is disadvantageous in that it requires a bubble generating device used to change a pure liquid state to a state in which liquid and gas are mixed. This results in a large size of equipment, requiring a large installation space. Due to spatial constraints, water treatment using low temperature plasma used only in limited areas.

DOCUMENTS OF RELATED ART

Patent Document

Korean Patent No. 10-1191146

DISCLOSURE

Technical Problem

Accordingly, the present invention has been made keeping in mind the above problems occurring in the prior art, and an object of the present invention is to provide a low temperature plasma generating device.

Another object of the present invention is to provide a low temperature plasma generating device that can be easily installed.

A further object of the present invention is to provide a device for sterilizing contaminated water using low temperature plasma.

Technical Solution

In order to accomplish the above objects, the present invention provides a low temperature plasma generating device including a first electrode of a tubular type, a second electrode that is arranged inside the first electrode to generate bubbles in water introduced into the first electrode, and an insulator arranged between the first electrode and the second electrode. The insulator may include an inorganic oxide or a polymer.

Preferably, the low temperature plasma generating device may further include a tube that accommodates the first electrode and the second electrode therein. Alternatively, the low temperature plasma generating device may further include a power supply to apply a voltage between the first electrode and the second electrode. The applied voltage may be equal to or higher than a first voltage at which plasma is generated between the first electrode and the second electrode and may be equal to or lower than a second voltage at which the insulator undergoes dielectric breakdown.

Preferably, the first electrode and the second electrode may be uniformly spaced from each other by a predetermined distance. The first electrode may be a tube of a mesh type or perforated type. The first electrode may be made from titanium (Ti) and coated with a transition metal.

Preferably, the second electrode may generate bubbles by distributing the water introduced into the first electrode. The second electrode may include a plurality of unit electrodes that is combined with each other at a predetermined angle and regular distance to each other and the unit electrode may be of a helical shape.

Advantageous Effects

According to the present invention, it is possible to realize a compact low temperature plasma generating device that can treat water by generating low temperature plasma underwater. The device is an eco-friendly device that can replace conventional chlorine-used sterilization that has been used to sterilize contaminated water such as ballast water or swimming pool water. The device is highly effective in sterilization of contaminated water and can be easily installed due to its compact size.

BEST MODE

The above-described objects, features, and advantages can be more clearly understood through the following description that is made with reference to the accompanying drawings. Therefore, those skilled in the art can easily practice the technical spirit of the present invention. In describing the present invention, descriptions of known related arts which have been deemed to obscure the gist of the present invention will be omitted below.

Underwater plasma generation requires a strong electric field formed between two electrodes facing each other. Activated electrons (e⁻) are generated between the two electrodes and the electrons collide with water molecules, thereby separating electrons from the water molecules, so new electrons can be generated. The generated electrons also collide with other water molecules and generate further new electrons. That is, electrons are newly and continuously generated. Due to the explosive increase in activated electrons, it is possible to maximize sterilization effect even with just a small amount of chlorine ($Cl_2$) that can be completely converted into hypochlorous acid. This results in improved sterilization efficiency because satisfactory sterilization can be achieved even with a single passing of water through a sterilization pipe.

Hereinafter, preferred embodiments of the present invention will be described with reference to the accompanying drawings.

Figure 1:
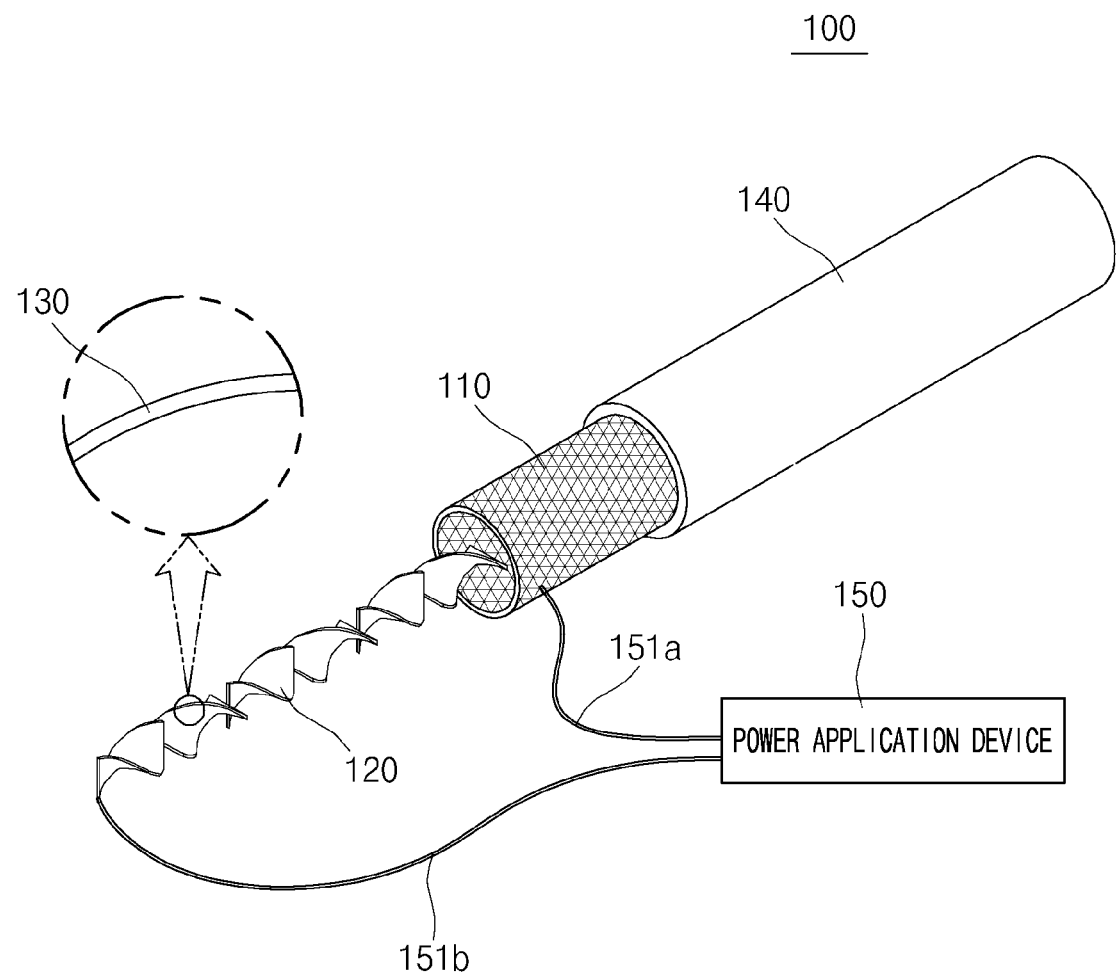
FIG. 1 is a diagram illustrating a low temperature plasma generating device according to one embodiment of the present invention.

FIG. 1 is a diagram illustrating the construction of an underwater low temperature plasma generating device according to one embodiment of the present invention. With reference to FIG. 1, a low temperature plasma generating device 100 includes a first electrode 110 of a tubular type, a second electrode 120, and an insulator 103. The low temperature plasma generating device 100 may further include a tube 140 and a power supply 150.

The first electrode 110 and the second electrode 120 are uniformly spaced from each other by a predetermined distance. This is to maintain a uniform reaction distance for plasma discharging that enables plasma generation.

The second electrode 120 is arranged inside the first electrode 110 to generate bubbles in water introduced into the first electrode 110. The second electrode 120 also increases a reaction area. The generation of bubbles is performed such that the second electrode 120 distributes water introduced into the first electrode 110.

The insulator 130 is arranged between the first electrode 110 and the second electrode 120. The insulator 130 may be formed by subjecting the first electrode 110 to an insulation process and then combining the pre-insulated first electrode 110 with the second electrode 120. The insulator 130 serves as a spacer that maintains a predetermined discharging distance between the first electrode 110 and the second electrode 120. The insulator 130 may be formed by subjecting the second electrode 120 to an insulation process at regular intervals. This construction maximizes generation of plasma through discharging, by precisely controlling a discharging distance between the two electrodes. The insulator 130 may include a polymer or inorganic oxide having outstanding dielectric strength. The inorganic oxide may be an aluminum oxide ($Al_2O_3$). The polymer may be an epoxy resin. The low temperature plasma generating device 100 safely and eco-friendly generates plasma and a concentrated electric field in an underwater condition in which two electrodes can be electrically conducted to each other, by preventing electrical conduction between the two electrodes in a manner of interposing the insulator 130 between the two electrodes. Specifically, since water has a high dielectric constant and thus has electric properties similar to those of metals, the two electrodes have to be insulated to create a strong electric field. When activated electrons (e⁻) are generated between the two electrodes, the generated electrons collide with water molecules in a medium, thereby generating new electrons. That is, when the number of electrons explosively increases in this way, sterilization effect can be achieved.

The tube 140 accommodates the first electrode 110 and the second electrode 120. The tube 140 serves as an outer shell to protect the first electrode 110 and the second electrode 120 from external impact. The tube 140 also functions to integrate the first electrode 110 and the second electrode 120 into a single body so that the low temperature plasma generating device can be easily manufactured. Therefore, the low temperature plasma generating device 100 can be used at any places, without limitation. Furthermore, when the low temperature plasma generating device 100 is connected to a water pipe in which water is flowing, it is possible to sterilize water without requiring an additional installation space.

The power supply 150 applies a voltage between the first electrode 110 and the second electrode 120. The voltage applied between the first electrode 110 and the second electrode 120 is applied through conductive wires 151a and 151b by the power supply 150. First ends of the conductive wires 151a and 151b are connected to the power supply 150 and second ends of the conductive wires 151a and 151b are respectively connected to the first electrode 110 and the second electrode 120. The applied voltage may be equal to or higher than a first voltage at which plasma can be generated and may be equal to or lower than a second voltage at which the insulator 130 undergoes dielectric breakdown. When the applied voltage is higher than the second voltage (dielectric breakdown voltage), the first and second electrodes are electrically conducted to each other in the contaminated water, so that generation of plasma that is the goal to be achieved by the present invention cannot be accomplished. As a result, water sterilization effect cannot be obtained. To apply a desired voltage between the first electrode 110 and the second electrode 120 so that low temperature plasma can be safely generated underwater, voltages at respective electrodes and an electric current are changed in accordance with the sizes of the first electrode 110 and the second electrode 120 and the volume of contaminated water to be treated. The low temperature plasma generating device 100 can be directly connected to a water pipe through which water flows. Therefore, it is possible to sterilize contaminated water at low costs because an additional installation space for the low temperature plasma generating device 100 is not necessary.

Figure 2A:
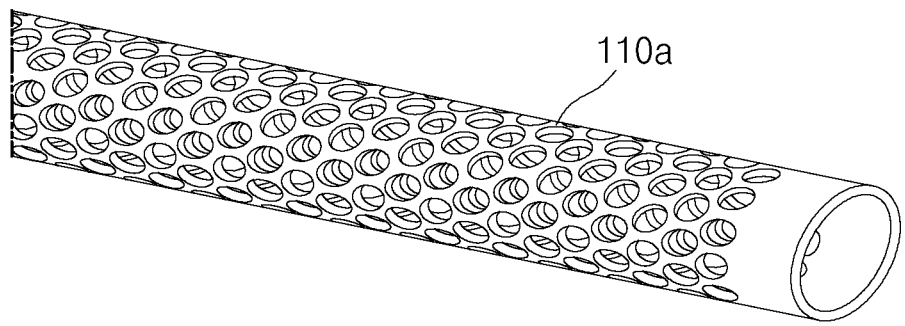
FIGS. 2A and 2B are perspective views illustrating a first electrode of the low temperature plasma generating device according to the embodiment of the present invention.
Figure 2B:
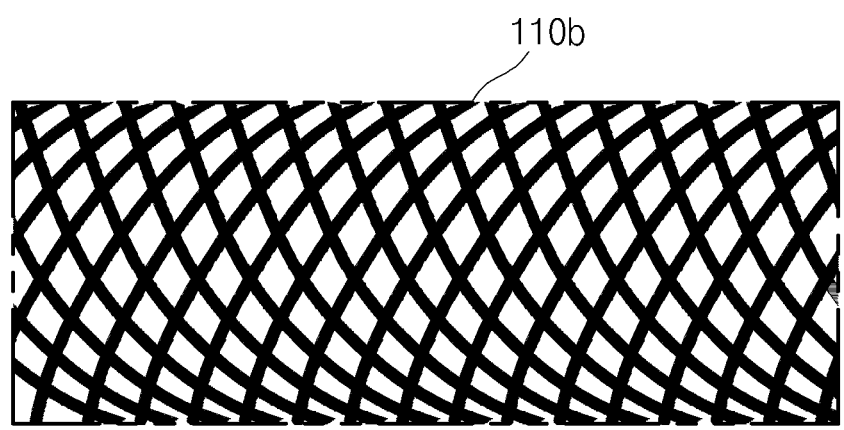

FIGS. 2A and 2B illustrate the first electrode of the low temperature plasma generating device according to the one embodiment of the present invention. With reference to FIGS. 2A and 2B, the first electrode 110 may have a cylinder shape. The first electrode 110 may be a tube of a perforated type 110a or a mesh type 110b. This structure is advantageous in terms of maintaining a predetermined distance between the first electrode 110 and the second electrode 120 (see FIG. 1) and maximizing a charging and discharging area or a reaction area. The first electrode 110 may be made from titanium (Ti). Alternatively, the first electrode 110 may be coated with a transition metal. Further alternatively, the first electrode 110 may be made from titanium and coated with a transition metal. An example of the transition metal is iridium (Ir). Iridium (Ir) serves as a catalyst during generation of plasma and can prolong the lifespan of the first electrode 110 and the second electrode 120.

Figure 3:
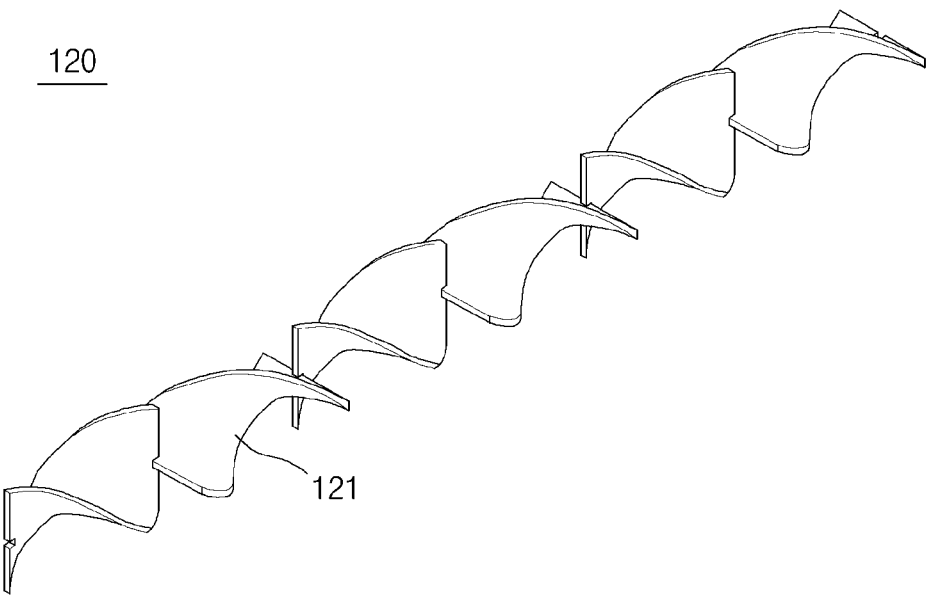
FIG. 3 and FIG. 4 are perspective views illustrating a second electrode of the low temperature plasma generating device according to the embodiment of the present invention.
Figure 4:
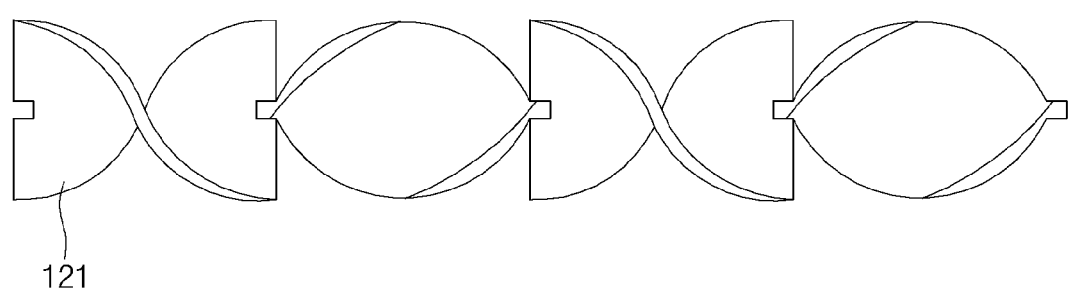

FIGS. 3 and 4 illustrate the second electrode of the low temperature plasma generating device according to the one embodiment of the present invention. With reference to FIGS. 3 and 4, the second electrode 120 includes a plurality of unit electrodes 121 that is combined with each other at a predetermined angle and regular distance to each other. The predetermined angle may be 90°. Preferably, the unit electrodes 121 have a predetermined length. This is to mechanically generate bubbles by continuously distributing water introduced into the first electrode 110 and to maximize a reaction area. Plasma can be more easily generated from a gas state compared to other states. For this reason, bubbles are generated in water so that water can exist as gas in the bubbles, and thus plasma can be easily generated from the gas of water molecules in bubbles.

Figure 5:
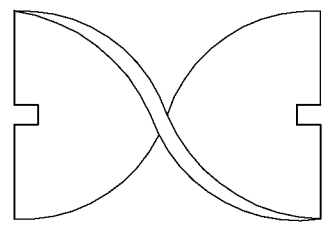
FIG. 5 is a diagram illustrating a unit electrode of the second electrode of the low temperature plasma generating device according to the embodiment of the present invention.

FIG. 5 illustrates the unit electrode of the second electrode of the low temperature plasma generating device according to one embodiment of the present invention. With reference to FIG. 5, the unit electrode 121 has a helical surface. The helical surface facilitates distribution of water and can repeatedly agitate water to maximize a chemical reaction area. With the generation of water bubbles, the helical surface also facilitates generation of activated electrons, which results in low temperature plasma being generated through discharging between charged electrodes, thereby maximizing sterilization effect. The helical shape of the unit electrode is advantageous in terms of maintaining a predetermined distance between the first electrode 110 and the second electrode 120 and increasing a surface area over the range of which plasma is generated.

When sterilizing contaminated water using a low temperature plasma generating device according to an embodiment of the present invention, water treatment capacity is as follows: when the tube has a diameter of 50 mm and the electrode has a length of 1000 mm, the water treatment capacity of the low temperature plasma generating device is 5 $m^3$/hr with the power consumption of about 400 W; when the tube has a diameter of 200 mm and the electrode has a length of 3000 to 5000 mm, the water treatment capacity of the low temperature plasma generating device is 300 to 400 $m^3$/hr with the power consumption of 2.0 to 4.5 kW; and when the tube has a diameter of 300 mm and the electrode has a length of 4000 to 5000 mm, the water treatment capacity of the low temperature plasma generating device is 600 to 1000 $m^3$/hr with the power consumption of 4.0 to 6.5 kW.

Although specific structures and functions of the present invention have been described in detail herein, those skilled in the art will appreciate that those are disclosed as a preferred embodiment only for illustrative purposes and should not be construed as limiting the present invention. Accordingly, the substantial protection scope of the present invention will be defined by the accompanying claims and equivalents thereof.

DESCRIPTION OF THE REFERENCE NUMERALS IN THE DRAWINGS

100: Low temperature plasma generating device
110: First electrode
120: Second electrode
130: Insulator
140: Tube
150: Power supply

What is claimed is:

1. A low temperature plasma generating device, comprising:
   a first electrode of a tubular type;
   a second electrode arranged inside the first electrode; and
   an insulator arranged between the first electrode and the second electrode,
   wherein the second electrode generates bubbles by distributing water introduced into the first electrode and has a plurality of unit electrodes combined with each other at a predetermined angle and regular distance.

2. The low temperature plasma generating device of claim 1, further comprising a tube that accommodates the first electrode and the second electrode therein.

3. The low temperature plasma generating device of claim 1, further comprising a power supply to apply a voltage between the first electrode and the second electrode, wherein the applied voltage is equal to or higher than a first voltage at which plasma is generated and is equal to or lower than a second voltage at which the insulator undergoes dielectric breakdown.

4. The low temperature plasma generating device of claim 1, wherein the first electrode and the second electrode are uniformly spaced from each other by a predetermined distance.

5. The low temperature plasma generating device of claim 1, wherein the first electrode is a tube of a mesh type or perforated type.

6. The low temperature plasma generating device of claim 1, wherein the first electrode is made from titanium (Ti).

7. The low temperature plasma generating device of claim 6, the first electrode is coated with a transition metal.

8. The low temperature plasma generating device of claim 1, wherein the unit electrode is of a helical shape.

9. The low temperature plasma generating device of claim 1, wherein the insulator comprises an inorganic oxide or a polymer.

* * * * *